United States Patent
Schutten et al.

(10) Patent No.: US 9,094,676 B1
(45) Date of Patent: Jul. 28, 2015

(54) SYSTEM, METHOD, AND COMPUTER PROGRAM PRODUCT FOR APPLYING A SETTING BASED ON A DETERMINED PHASE OF A FRAME

(75) Inventors: Robert Jan Schutten, San Jose, CA (US); Gerrit A. Slavenburg, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 884 days.

(21) Appl. No.: 13/247,907

(22) Filed: Sep. 28, 2011

Related U.S. Application Data

(60) Provisional application No. 61/387,948, filed on Sep. 29, 2010.

(51) Int. Cl.
  *H04N 9/47* (2006.01)
  *H04N 13/04* (2006.01)

(52) U.S. Cl.
  CPC .................... *H04N 13/0429* (2013.01)

(58) Field of Classification Search
  CPC ............ H04N 2213/008; H04N 13/0429; H04N 13/0434; H04N 13/0438
  USPC ........... 348/42, 51, 53; 345/90, 204, 211, 213
  See application file for complete search history.

(56) References Cited

U.S. PATENT DOCUMENTS

| | | | |
|---|---|---|---|
| 4,912,557 A | 3/1990 | Faroudja | |
| 5,486,868 A | 1/1996 | Shyu et al. | |
| 5,568,314 A | 10/1996 | Omori et al. | |
| 5,796,373 A | 8/1998 | Ming-Yen | |
| 5,878,216 A | 3/1999 | Young et al. | |
| 5,943,504 A | 8/1999 | Flurry et al. | |
| 5,963,200 A | 10/1999 | Deering et al. | |
| 5,976,017 A | 11/1999 | Omori et al. | |
| 6,002,518 A | 12/1999 | Faris | |
| 6,011,581 A | 1/2000 | Swift et al. | |
| 6,529,175 B2 | 3/2003 | Tserkovnyuk et al. | |
| 6,532,008 B1 | 3/2003 | Guralnick | |
| 6,977,629 B2 | 12/2005 | Weitbruch et al. | |
| 7,061,477 B1 | 6/2006 | Noguchi | |
| 7,103,702 B2 | 9/2006 | Funamoto | |
| 7,215,356 B2 | 5/2007 | Lin et al. | |

(Continued)

FOREIGN PATENT DOCUMENTS

| | | |
|---|---|---|
| CN | 101371292 A | 2/2009 |
| CN | 101415126 A | 4/2009 |

(Continued)

OTHER PUBLICATIONS

Office Action from Chinese Application No. 200780001629.6 mailed on Feb. 24, 2010.

(Continued)

*Primary Examiner* — Allen Wong
(74) *Attorney, Agent, or Firm* — Zilka-Katob, PC

(57) ABSTRACT

A system, method, and computer program product are provided for determining that a display device is operating in a three-dimensional mode. Further, in response to the determination that the display device is operating in the three-dimensional mode, determining a phase of a current frame. Additionally, a setting from a first table or a setting from a second table is applied based on the determined phase of the current frame.

20 Claims, 6 Drawing Sheets

(56) References Cited

U.S. PATENT DOCUMENTS

| | | |
|---|---|---|
| 7,256,791 B2 | 8/2007 | Sullivan et al. |
| 7,385,625 B2 | 6/2008 | Ohmura et al. |
| 7,490,296 B2 | 2/2009 | Feldman et al. |
| 7,502,010 B2 | 3/2009 | Kirk |
| 7,724,211 B2 | 5/2010 | Slavenburg et al. |
| 8,169,467 B2 | 5/2012 | Slavenburg et al. |
| 8,274,448 B1 | 9/2012 | Cook |
| 8,363,096 B1 | 1/2013 | Aguirre |
| 8,482,605 B2 | 7/2013 | Myokan |
| 8,576,208 B2 | 11/2013 | Slavenburg et al. |
| 8,581,833 B2 | 11/2013 | Slavenburg et al. |
| 8,872,754 B2 | 10/2014 | Slavenburg et al. |
| 8,878,904 B2 | 11/2014 | Slavenburg et al. |
| 2002/0007723 A1 | 1/2002 | Ludwig |
| 2002/0196199 A1 | 12/2002 | Weitbruch et al. |
| 2003/0030608 A1 | 2/2003 | Kurumisawa et al. |
| 2003/0038807 A1 | 2/2003 | Demos et al. |
| 2003/0234892 A1 | 12/2003 | Hu et al. |
| 2004/0130645 A1 | 7/2004 | Ohmura et al. |
| 2006/0012676 A1 | 1/2006 | Tomita |
| 2006/0146003 A1 | 7/2006 | Diefenbaugh et al. |
| 2006/0268104 A1 | 11/2006 | Cowan et al. |
| 2007/0091058 A1 | 4/2007 | Nam et al. |
| 2007/0165942 A1 | 7/2007 | Jin et al. |
| 2007/0229395 A1 | 10/2007 | Slavenburg et al. |
| 2007/0229487 A1 | 10/2007 | Slavenburg et al. |
| 2007/0247478 A1 | 10/2007 | Hagino et al. |
| 2008/0192034 A1* | 8/2008 | Chen et al. ............. 345/204 |
| 2008/0252578 A1 | 10/2008 | Kim et al. |
| 2009/0122052 A1* | 5/2009 | Huang et al. ............. 345/213 |
| 2009/0132951 A1 | 5/2009 | Feldman et al. |
| 2009/0150776 A1 | 6/2009 | Feldman et al. |
| 2009/0150777 A1 | 6/2009 | Feldman et al. |
| 2009/0179845 A1* | 7/2009 | Song et al. ............. 345/90 |
| 2010/0020062 A1 | 1/2010 | Liou et al. |
| 2010/0033555 A1 | 2/2010 | Nagase et al. |
| 2010/0045690 A1 | 2/2010 | Handschy et al. |
| 2010/0066820 A1 | 3/2010 | Park et al. |
| 2010/0194733 A1* | 8/2010 | Lin et al. ............. 345/211 |
| 2010/0201791 A1 | 8/2010 | Slavenburg et al. |
| 2010/0208043 A1 | 8/2010 | Hoffman |
| 2010/0231696 A1 | 9/2010 | Slavenburg et al. |
| 2010/0231698 A1 | 9/2010 | Nakahata et al. |
| 2010/0253665 A1 | 10/2010 | Choi et al. |
| 2010/0289883 A1 | 11/2010 | Goris et al. |
| 2011/0012904 A1 | 1/2011 | Slavenburg et al. |
| 2011/0032440 A1 | 2/2011 | Robinson et al. |
| 2011/0063424 A1 | 3/2011 | Matsuhiro et al. |
| 2011/0074773 A1 | 3/2011 | Jung |
| 2011/0090319 A1* | 4/2011 | Kim et al. ............. 348/51 |
| 2011/0109656 A1 | 5/2011 | Nakagawa et al. |
| 2011/0109733 A1 | 5/2011 | Kim et al. |
| 2011/0115994 A1 | 5/2011 | Jung et al. |
| 2011/0148860 A1 | 6/2011 | Tsai et al. |
| 2011/0157332 A1 | 6/2011 | Kim et al. |
| 2011/0187705 A1 | 8/2011 | Lan et al. |
| 2011/0205335 A1 | 8/2011 | Kim et al. |
| 2011/0205625 A1 | 8/2011 | Auld |
| 2011/0221747 A1 | 9/2011 | Kim et al. |
| 2011/0267341 A1 | 11/2011 | Jung et al. |
| 2011/0310234 A1 | 12/2011 | Sarma et al. |
| 2012/0002123 A1 | 1/2012 | Kang |
| 2012/0007970 A1 | 1/2012 | Ko |
| 2012/0013614 A1 | 1/2012 | Matsuhiro et al. |
| 2012/0019637 A1 | 1/2012 | Ko et al. |
| 2012/0033053 A1 | 2/2012 | Park et al. |
| 2012/0038624 A1 | 2/2012 | Slavenburg |
| 2012/0075437 A1 | 3/2012 | Slavenburg et al. |
| 2013/0038684 A1 | 2/2013 | Slavenburg |
| 2013/0271582 A1 | 10/2013 | Slavenburg et al. |

FOREIGN PATENT DOCUMENTS

| | | |
|---|---|---|
| CN | 101697595 A | 4/2010 |
| CN | 101860766 A | 10/2010 |
| CN | 102034449 A | 4/2011 |
| CN | 102055993 A | 5/2011 |
| CN | 102111627 A | 6/2011 |
| CN | 102160386 A | 8/2011 |
| CN | 102378028 A | 3/2012 |
| EP | 1363264 A2 | 11/2003 |
| EP | 2228998 A2 | 9/2010 |
| EP | 2262272 A2 | 12/2010 |
| EP | 2339864 A2 | 6/2011 |
| EP | 2362666 A1 | 8/2011 |
| EP | 2365697 A2 | 9/2011 |
| GB | 2475367 A | 5/2011 |
| JP | 01073892 A2 | 3/1989 |
| JP | H09-051552 | 2/1997 |
| JP | 2000-004451 | 1/2000 |
| JP | 2000284224 A2 | 10/2000 |
| JP | 2001045524 A2 | 2/2001 |
| JP | 2001154640 A | 6/2001 |
| JP | 2003202519 A | 7/2003 |
| JP | 2007110683 A2 | 4/2007 |
| JP | 2007114793 A | 5/2007 |
| JP | 2006152897 A | 7/2009 |
| KR | 20040001831 A | 1/2004 |
| KR | 20060007662 A | 1/2006 |
| KR | 20070077863 A | 7/2007 |
| KR | 20070115524 A | 12/2007 |
| KR | 20100022653 A | 3/2010 |
| KR | 20100032284 A | 3/2010 |
| KR | 20100035774 A | 4/2010 |
| TW | 550519 B | 9/2003 |
| WO | 99/31884 A1 | 6/1999 |
| WO | WO2007126904 A2 | 11/2007 |
| WO | 2009069026 A2 | 6/2009 |
| WO | WO2009069026 A2 | 6/2009 |
| WO | 2010032927 A2 | 3/2010 |
| WO | WO2010032927 A2 | 3/2010 |
| WO | WO2010064557 A1 | 6/2010 |
| WO | WO2010107227 A2 | 9/2010 |
| WO | WO2011028065 A2 | 3/2011 |

OTHER PUBLICATIONS

Notice of Allowance and Fee(s) Due from U.S. Appl. No. 11/462,529 dated Feb. 8, 2010.
Final Office Action from U.S. Appl. No. 11/462,529 dated Dec. 2, 2009.
Cook, D., U.S. Appl. No. 11/532,005, filed Sep. 14, 2006.
International Preliminary Report on Patentability from PCT Application No. PCT/US2007/007702 issued on Sep. 30, 2008.
Non-Final Office Action from U.S. Appl. No. 11/462,529 dated Apr. 16, 2009.
International Search Report and Written Opinion from PCT Application No. PCT/US2007/007702 mailed on Apr. 2, 2008.
Non-Final Office Action from U.S. Appl. No. 12/854,100 dated Mar. 16, 2012.
Notice of Allowance from U.S. Appl. No. 11/462,535 dated Mar. 2, 2012.
Non-Final Office Action from U.S. Appl. No. 12/787,346 dated Jun. 8, 2012.
Notice of Grant of Patent Right for Invention from Chinese Patent Application No. 201010522450.9 dated Jul. 19, 2012 (Translation Only).
Office Action from Chinese Patent Application No. 201010522450.9 dated Dec. 23, 2011.
Notice of Allowance from Taiwan Patent Application No. 096111054 dated Feb. 29, 2012.
Notice of Allowance from Korean Patent Application No. 10-2007-0031168 dated Jan. 13, 2011.
Combined Search and Examination Report from UK Patent Application No. GB1112746.1 dated Nov. 10, 2011.
Non-Final Office Action from U.S. Appl. No. 12/765,771 dated May 25, 2012.

(56) References Cited

OTHER PUBLICATIONS

Non-Final Office Action from U.S. Appl. No. 11/462,535 dated Oct. 26, 2011.
Office Action from Canadian Patent Application No. 2,646,439 dated Oct. 28, 2011.
Examination Report from European Patent Application No. 07 754 251.2 dated Dec. 7, 2010.
Office Action from Taiwan Patent Application No. 096111054 dated Oct. 31, 2011.
Notice of Allowance from Korean Patent Application No. 10-2010-0092504 dated Sep. 28, 2011.
Decision to Grant from Japanese Patent Application No. 2009-502980 dated Sep. 20, 2011.
Slavenburg, G., U.S. Appl. No. 13/248,960, filed Sep. 29, 2011.
Cook, D., U.S. Appl. No. 11/531,995, filed Sep. 14, 2006.
Notice of Reasons for Rejection from Japanese Application No. 2009-502980 mailed Feb. 8, 2011.
Notice of Preliminary Rejection from Korean Application No. 10-2010-0092504 mailed Dec. 28, 2010.
Notice of Preliminary Rejection from Korean Application No. 10-2007-0031168 mailed Jul. 22, 2010.
Extended European Search Report from Application No. 07754251.2 mailed Sep. 9, 2009.
Final Notice of Reasons for Rejection from Japanese Application No. 2009-502980 mailed Jun. 21, 2011.
Non-Final Office Action from U.S. Appl. No. 11/462,535 dated May 24, 2011.
i-O Display Systems, "Featured Products", retrieved from http://web.archive.org/web/20060812053513/http://www.i-glassesstore.com/index.html on Aug. 12, 2006, (2 pages).
International Telecommunication Union: "Characteristics of B,G/PAL and M/NTSC Television Systems (Excerpt from ITU-R BT.470-5 Conventional Television Systems)", Feb. 1998, retrieved from http://www.kolumbus.fi/pami1/video/pal_ntsc.html on Jun. 8, 2011, (5 pages).
Video Electronics Standards Association (VESA), "Coordinated Video Timings (CVT) Standard V1.1", Sep. 10, 2003, Milpitas, CA, USA, retrieved from http://web.archive.org/web/20040204215505/http://www.vesa.org/summary/sumcvt.htm on Jun. 8, 2011, (6 pages).
Notice of Grant of Patent Right for Invention from Chinese Application No. 200780001629.6 issued Aug. 13, 2010.
Slavenburg, G., U.S. Appl. No. 61/387,947, filed Sep. 29, 2010.
Notice of Preliminary Rejection from Korean Patent Application No. 10-2011-0078998, dated Aug. 10, 2012.
Final Office Action from U.S. Appl. No. 12/854,100 dated Aug. 27, 2012.
Schutten, R., U.S. Appl. No. 61/387,948, filed Sep. 29, 2010.
Slavenburg, G. A., U.S. Appl. No. 12/901,447, filed Oct. 8, 2010.
Final Office Action from U.S. Appl. No. 12/765,771, dated Jan. 7, 2013.
Notice of Allowance from U.S. Appl. No. 12/765,771, dated Jun. 24, 2013.
Advisory Action from U.S. Appl. No. 12/765,771, dated Apr. 25, 2013.
Office Action from Taiwan Patent Application No. 101105435, dated Jan. 10, 2014.
Final Office Action from U.S. Appl. No. 12/787,346, dated Jan. 9, 2013.
Notice of Allowance from U.S. Appl. No. 12/787,346, dated Jul. 9, 2013.
Advisory Action from U.S. Appl. No. 12/787,346, dated Apr. 25, 2013.
Non-Final Office Action from U.S. Appl. No. 12/892,147, dated Dec. 31, 2012.
Non-Final Office Action from U.S. Appl. No. 12/892,147, dated Dec. 5, 2013.
Final Office Action from U.S. Appl. No. 12/892,147, dated Sep. 4, 2013.
Notice of Allowance from U.S. Appl. No. 12/892,147, dated Jul. 18, 2014.
Decision to Refuse from European Patent Application No. 07754251.2, dated Apr. 11, 2013.
Summons to Attend Oral Proceedings from European Patent Application No. 07754251.2, dated Oct. 8, 2012.
Final Office Action from U.S. Appl. No. 13/311,451, dated Jun. 5, 2013.
Notice of Allowance from U.S. Appl. No. 13/311,451, dated Mar. 12, 2014.
Non-Final Office Action from U.S. Appl. No. 13/311,451, dated Oct. 22, 2013.
Non-Final Office Action from U.S. Appl. No. 13/311,451, dated Nov. 21, 2012.
Advisory Action from U.S. Appl. No. 13/311,451, dated Sep. 6, 2013.
Advisory Action from U.S. Appl. No. 12/854,100, dated Nov. 21, 2012.
Final Office Action from U.S. Appl. No. 12/854,100, dated Sep. 11, 2014.
Non-Final Office Action from U.S. Appl. No. 12/854,100, dated May 8, 2014.
Advisory Action from U.S. Appl. No. 13/208,290, dated Aug. 7, 2014.
Final Office Action from U.S. Appl. No. 13/208,290, dated Jun. 4, 2014.
Non-Final Office Action from U.S. Appl. No. 13/208,290, dated Dec. 5, 2013.
Decision on Rejection from Chinese Application No. 201110227831.9, dated Jul. 3, 2014.
Office Action from Chinese Application No. 201110227831.9, dated Sep. 13, 2013.
Examination Report from German Patent Application No. 10 2011 080 776.4, dated Sep. 18, 2013.
Examination Report from GB Patent Application No. GB1112746.1, dated Jul. 25, 2013.
Final Rejection from Japanese Patent Application No. 2011-161191, dated Jun. 3, 2014.
Notice of Reasons for Rejection from Japanese Patent Application No. 2011-161191, dated Dec. 18, 2012.
Office Action from Japanese Patent Application No. 2011-161191, dated Sep. 17, 2013.
Notice of Allowance from Korean Patent Application No. 10-2011-0078998, dated Jul. 24, 2013.
Notice of Final Rejection from Korean Patent Application No. 10-2011-0078998, dated Mar. 28, 2013.
Non-Final Office Action from U.S. Appl. No. 13/248,960, dated Aug. 1, 2014.
Non-Final Office Action from U.S. Appl. No. 13/444,783, dated Sep. 23, 2014.
Office Action from Chinese Patent Application No. 201310125583.6, dated Dec. 17, 2014.
Chen, Chun-Ho et al., "3-D Mobile Display Based on Moire-Free Dual Directional Backlight and Driving Scheme for Image Crosstalk Reduction," Journal of Display Technology, vol. 4, No. 1, Mar. 2008, pp. 92-96.
Notice of Allowance from U.S. Appl. No. 13/248,960, dated Apr. 21, 2015.
Final Office Action from U.S. Appl. No. 13/444,783, dated Mar. 30, 2015.
Notice of Allowance from Japanese Patent Application No. 2011-161191, dated Apr. 7, 2015.
Non-Final Office Action from U.S. Appl. No. 12/854,100, dated Mar. 6, 2015.

* cited by examiner

US 9,094,676 B1

SYSTEM, METHOD, AND COMPUTER PROGRAM PRODUCT FOR APPLYING A SETTING BASED ON A DETERMINED PHASE OF A FRAME

RELATED APPLICATION(S)

The present application claims the priority of a previously filed provisional application filed Sep. 29, 2010 under Ser. No. 61/387,948, which is incorporated herein by reference in its entirety.

FIELD OF THE INVENTION

The present invention relates to display systems, and more particularly to display systems operating in a three-dimensional display mode.

BACKGROUND

Traditionally, display systems include display panel cells that are direct current (DC) driven. Further, these display panel cells are driven with an alternating drive voltage polarity on each frame. Additionally, when a display for the display system is operating in a frame sequential method for displaying a three-dimensional image, the display may receive a different pixel value for each frame.

For example, a region of cells may be black (e.g. G0) in a left eye view, and the same region of cells may be gray (e.g. G160) in a right eye view. Further, in the context of the current example, for such a region, each cell of the display may be alternately driven across as G0, G160, G0, and G160, switching the value every frame. Additionally, since a cell value changes and the drive voltage polarity alternates for the cell for each frame, a direct current imbalance may occur causing a slow luminance drift of the cell, where an intensity of the cell slowly drifts to a stable value over a time period.

Therefore, the slow luminance drift for a cell presents a problem for display systems operating in a three-dimensional display mode and there is thus a need for addressing these and/or other issues associated with the prior art.

SUMMARY

A system, method, and computer program product are provided for determining that a display device is operating in a three-dimensional mode. Further, in response to the determination that the display device is operating in the three-dimensional mode, determining a phase of a current frame. Additionally, a setting from a first table or a setting from a second table is applied based on the determined phase of the current frame.

DETAILED DESCRIPTION

Figure 1:
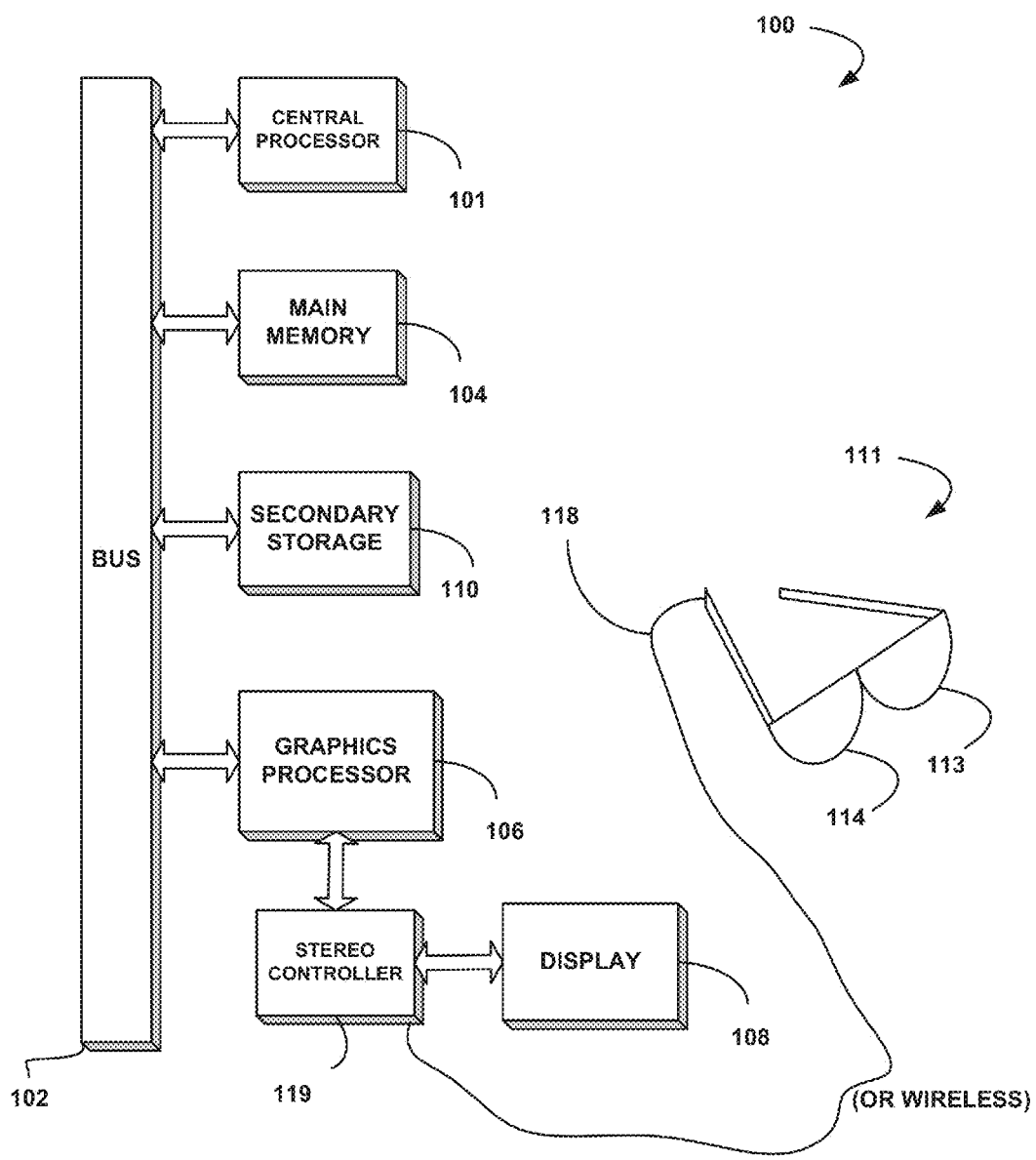
FIG. 1 illustrates an exemplary computer system in which the various architecture and/or functionality of various embodiments may be implemented.

FIG. 1 illustrates an exemplary computer system 100 in which the various architecture and/or functionality of various embodiments may be implemented. As shown, a computer system 100 is provided including at least one host processor 101, which is connected to a communication bus 102. The computer system 100 also includes a main memory 104. Control logic (software) and data are stored in the main memory 104 which may take the form of random access memory (RAM).

The computer system 100 also includes a graphics processor 106 and a display 108 in the form of a liquid crystal display (LCD), digital light processing (DLP) display, liquid crystal on silicon (LCOS) display, organic light emitting diode (OLED) display, plasma display, or other similar display. In one embodiment, the graphics processor 106 may include a plurality of shader modules, a rasterization module, etc. Each of the foregoing modules may even be situated on a single semiconductor platform to form a graphics processing unit (GPU). Further, in yet another embodiment, the display 108 may include a processor.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 100 may also include a secondary storage 110. The secondary storage 110 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 104 and/or the secondary storage 110. Such computer programs, when executed, enable the computer system 100 to perform various functions. Main memory 104, secondary storage 110 and/or any other storage are possible examples of computer-readable media.

Further included is a pair of shutter glasses 111 capable of being worn on a face of a user. While the shutter glasses 111 are shown to include two elongated members for supporting the same on the face of the user, it should be noted that other constructions (e.g. member-less design, head strap, helmet, etc.) may be used to provide similar or any other type of support. As further shown, the shutter glasses 111 also include a right eye shutter 114 and a left eye shutter 113. Optionally, the shutter glasses 111 may include active shutter glasses.

In one embodiment, both the right eye shutter 114 and left eye shutter 113 are capable of both an open orientation and a closed orientation. In use, the open orientation allows more light therethrough with respect to the closed orientation. Of course, such orientations may be achieved by any desired mechanical, electrical, optical, and/or any other mechanism capable of carrying out the above functionality.

In the context of the current embodiment, for control purposes, the shutter glasses 111 may be coupled to a stereo controller 119 via a cable 118 (or without the cable 118 in a wireless environment). As an example, in the wireless environment, the shutter glasses 111 may be in communication with an emitter coupled to the stereo controller 119, the communication bus 102, etc. The stereo controller 119 is, in turn, coupled between the graphics processor 106 and the display 108 for carrying out the functionality to be set forth hereinafter. While the stereo controller 119 is shown to reside between the graphics processor 106 and the display 108, it should be noted that the stereo controller 119 may reside in any location associated with the computer system 100, the shutter glasses 111, and/or even in a separate module, particularly (but not necessarily) in an embodiment where the graphics processor 106 is attached to a separate interface [e.g. universal serial bus (USB), etc.] on the computer system 100. In one embodiment, the display 108 may be directly connected to the computer system 100, and the stereo controller 119 may further be directly connected to the computer system 100 via a USB interface. Still yet, the stereo controller 119 may comprise any hardware and/or software capable of the providing the desired functionality.

Specifically, in some embodiments, the right eye shutter 114 and left eye shutter 113 are controlled to switch between the closed orientation and the open orientation. As an option, the right eye shutter 114 and left eye shutter 113 of the shutter glasses 111 may be controlled such that the right eye shutter 114 and left eye shutter 113 simultaneously remain in the closed orientation for a predetermined amount of time.

In addition to and/or instead of the foregoing technique, the stereo controller 119, the display 108, and/or any other appropriate hardware/software associated with the computer system 100 may be equipped with functionality for adapting the display 108 in a way that enhances a viewing experience when display content is viewed utilizing the shutter glasses 111.

Of course, it should be noted that the system 100 is not limited to the use of the shutter glasses 111, but instead may optionally include passive polarization glasses (not shown). Further, the passive polarization glasses may include a left eye lens and a right eye lens. Optionally, a first polarization may be associated with the left eye lens that is different from a second polarization associated with the right eye lens. In one embodiment, the passive polarization glasses may be utilized when viewing content displayed by an active polarization device.

Furthermore, in one embodiment, the display 108 may include the active polarization device (e.g. an active retarder, a Z-screen, etc.). As an option, the active polarization device may be positioned in front of a display panel (e.g. a LCD panel, an OLED panel) of the display 108. For example, the active polarization device may be positioned directly in front of an LCD panel of the display 108. Further, as yet another option, the active polarization device may switch polarization on a frame by frame basis. For example, the active polarization device of the display 108 may perform active switching thereby changing the polarization associated with the active polarization device every other frame.

In yet another embodiment, a first polarization of the active polarization device may be associated with the left eye lens of the passive polarization glasses, and a second polarization of the active polarization device may be associated with the right eye lens of the passive polarization glasses. Optionally, the first polarization and the second polarization may be fixed.

For example, the first polarization of the active polarization device may be associated with a left eye frame intended for viewing through the left eye lens of the passive polarization glasses, and the second polarization of the active polarization device may be associated with a right eye frame intended for viewing through the right eye lens of the passive polarization glasses.

For example, in one embodiment, the architecture and/or functionality of the various following figures may be implemented in the context of the host processor 101, graphics processor 106, the processor of the display 108, a chipset (i.e. a group of integrated circuits designed to work and sold as a unit for performing related functions, etc.), and/or any other integrated circuit for that matter. Still yet, the architecture and/or functionality of the various following figures may be implemented in the context of a general computer system, a circuit board system, a game console system dedicated for entertainment purposes, an application-specific system, and/or any other desired system.

For example, the system 100 may take the form of a desktop computer, lap-top computer, and/or any other type of logic. Still yet, the system 100 may take the form of various other devices including, but not limited to, a personal digital assistant (PDA) device, a mobile phone device, a television, etc.

Further, while not shown, the system 100 may be coupled to a network [e.g. a telecommunications network, local area network (LAN), wireless network, wide area network (WAN) such as the Internet, peer-to-peer network, cable network, etc.) for communication purposes.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
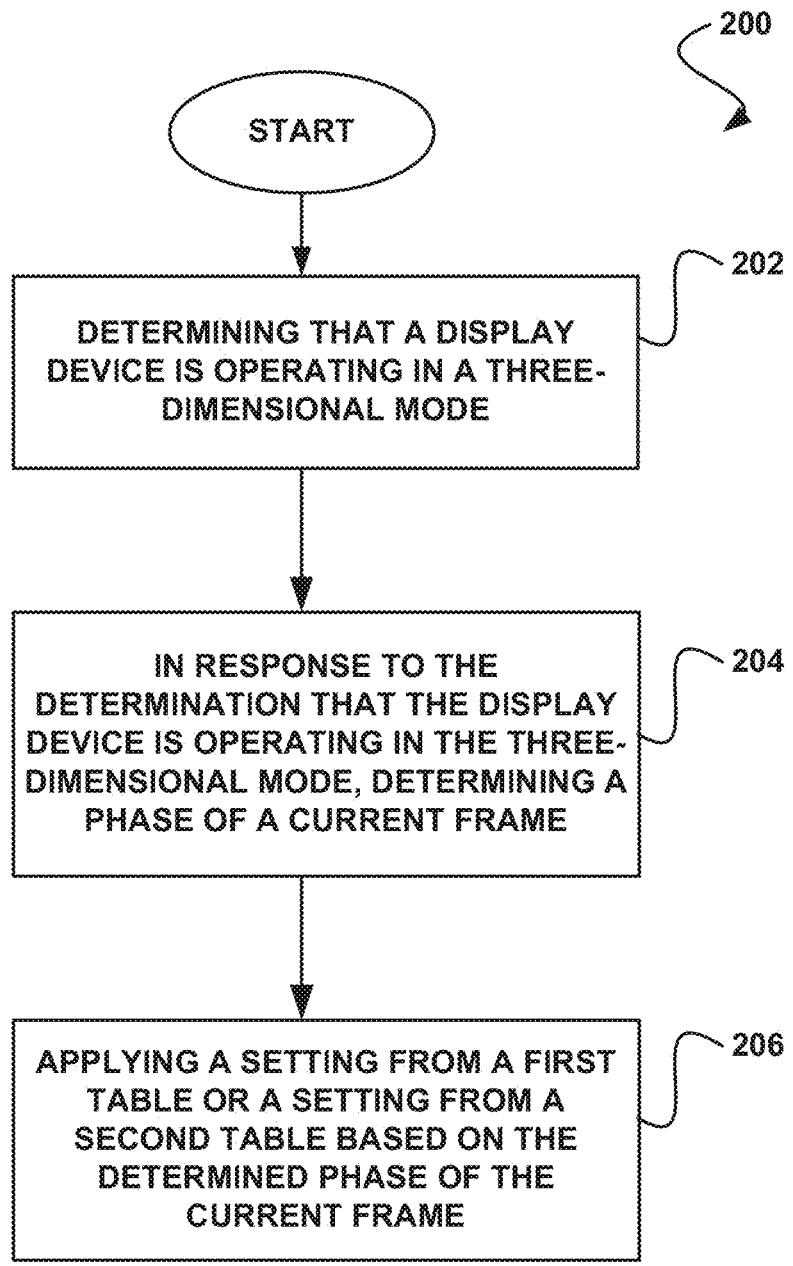
FIG. 2 shows a method for applying a setting based on a determined phase of a frame, in accordance with one embodiment.

FIG. 2 shows a method 200 for applying a setting based on a determined phase of a frame, in accordance with one embodiment. As an option, the present method 200 may be implemented in the context of the functionality and architecture of FIG. 1. Of course, however, the method 200 may be carried out in any desired environment. It should also be noted that the aforementioned definitions may apply during the present description.

As shown in operation 202, it is determined that a display device is operating in a three-dimensional mode. In the context of one embodiment, the display device may include a computer display, a display panel of a portable device, a television display, or any other display such as the display 108 of FIG. 1. Optionally, the display device may include a liquid crystal display (LCD).

Furthermore, as an option, the display device may include a stereo capable display device. As yet another option, the stereo capable display device may display content for viewing with shutter glasses (e.g. shutter glasses 111 of FIG. 1, etc.). Optionally, the display device may include an active polarization device that changes a polarization of light emitted from the display device on a frame by frame basis for viewing with passive polarization glasses.

Additionally, in another embodiment, the display device may be capable of operating in a two-dimensional mode. As an option, when the display device is operating in a two-dimensional mode, the display device may display a sequence of frames intended for viewing by at least one viewer. For example, when the display device is operating in the two-dimensional mode, the display device may display a series of frames that are intended for viewing by both eyes of the viewer.

Furthermore, in accordance with yet another embodiment, the display device may be capable of operating in a three-dimensional mode. Optionally, when the display device is operating in the three-dimensional mode, the display device may display a series of frames in a frame sequential manner. As an example, displaying the series of frames in the frame sequential manner may include displaying a first frame intended for one eye of the viewer, then displaying a second frame intended for another eye of the viewer. Further, as yet another example, when the display device is operating in the three-dimensional mode, the display device may display a left eye frame intended for viewing by a left eye of the viewer, followed by a right eye frame intended for viewing by a right eye of the viewer. Additionally, as yet another option, when the device is operating in the three-dimensional mode, the display device may display content for viewing with the shutter glasses (e.g. the shutter glasses 111 of FIG. 1, etc.) or the passive polarization glasses.

Additionally, the operating mode of the display device may be determined by the display device. Optionally, the display device may determine the current operating mode of the display device by reading a register, a setting, an attribute, etc. associated with the display device. In addition, the operating mode of the display device may be indicated in a firmware of the display device. For example, the firmware of the display device may instruct the display device to operate in the two-dimensional mode or the three-dimensional mode. As another option, a processor of the display device may determine the current operating mode of the display device. Furthermore, the operating mode of the display device may be indicated to the display device by another device (e.g. a graphics processing unit of FIG. 1, etc.) in communication with the display device. Still yet, the operating mode of the display device may be indicated to the display device by a driver in communication with the display device.

Further, in response to the determination that the display device is operating in the three-dimensional mode, a phase of a current frame is determined. See operation 204. In one embodiment, the display device may utilize a three-dimensional mode aware polarity reversal. As an option, the three-dimensional mode aware polarity reversal may invert a polarity of each cell of the display device every N number of frames. Additionally, the N number of frames may be even and may include at least two frames. Optionally, the N number of frames may include at least four frames, at least six frames, at least eight frames, etc.

In addition, the polarity (e.g. a drive polarity, etc.) of each cell of the display device may include a positive polarity (e.g. +) or a negative polarity (e.g. −). For example, the polarity of each cell of the display device may include a positive voltage (e.g. +V) or a negative voltage (e.g. −V). Optionally, the inverting of the polarity of each cell of the display device may include changing the positive polarity to the negative polarity. Further, as another option, the inverting of the polarity of each cell of the display device may include changing the negative polarity to the positive polarity. For example, if the N number of frames includes two frames, a voltage polarity of a particular cell for a first frame and a second frame may be positive, a voltage polarity of the particular cell for a third frame and a fourth frame may be negative, a voltage polarity of the particular cell for a fifth frame and a sixth frame may be positive, etc. (e.g. +V, +V, −V, −V, +V, +V, etc.). Still, as another option, the N number of frames may indicate that the particular cell is driven with the positive polarity for the N number of frames followed by the particular cell being driven for with the negative polarity for the N number of frames.

Furthermore, as yet another option, each cell of the display device may be direct current (DC) neutral driven by inverting the polarity each cell of the display device every N number of frames. Optionally, the display device may include a plurality of cells that are direct current balanced (e.g. direct current neutral) when an average value of a current for each cell is zero over the N number of frames where the cell is driven with a positive polarity and the N number of frames where the cell is driven with a negative polarity. Additionally, the cells of the display device may output a consistent luminance in response to the cells being direct current balanced over the N number of frames where the cells are driven with the positive polarity and the N number of frames where the cells are driven with the negative polarity. Optionally, each pixel of the display device may include at least one cell of the display device.

As an option, the phase of the current frame may be based on a polarity of a first frame and a polarity of a second frame. Optionally, the first frame may include the current frame and the second frame may include a previous frame. For example, determining the phase of the current frame may include determining the polarity of a current frame and the polarity of previous frame.

In one embodiment, if the polarity of the current frame is determined to be the opposite of the polarity of the previous frame, then the determined phase may include a first phase. Further, as an option, the first phase may be associated with a first table. Optionally, the first table may include an overdrive table. In addition, the overdrive table may include at least one setting. As another option, the overdrive table may include at least one voltage setting. As an example, if the polarity of the current frame is opposite of the polarity of the previous frame, then the determined phase may include a first phase. In another embodiment, the first phase may include "Phase A" and the first table may include a "Phase A" overdrive table. Furthermore, the first phase may be direct current balanced.

In one embodiment, if the polarity of the current frame is determined to be the same of the polarity of the previous frame, then the determined phase may include a second phase. Further, as an option, the second phase may be associated with a second table. Optionally, the second table may include an overdrive table. In addition, the overdrive table may include at least one setting. As another option, the overdrive table may include at least one voltage setting. As an example, if the polarity of the current frame is the same of the polarity of the previous frame, then the determined phase may include a second phase. In another embodiment, the second phase may include "Phase B" and the second table may include a "Phase B" overdrive table. Furthermore, the second phase may be direct current balanced.

In addition, as shown in operation 206, a setting from a first table or a setting from a second table is applied based on the determined phase of the current frame. As an option, if the determined phase includes the first phase, then a setting from the first table may be applied. Further, as another option, if the determined phase includes the second phase, then a setting from the second table may be applied. For example, the setting from the first table or the setting from the second table may be applied to make a luminance level of a same cell identical in the first and second phase. As an option, the setting may include a drive voltage.

Additionally, in one embodiment, the first table and the second table may each include a separate overdrive table. As an option, each table may be included in memory. For example, the first table and the second table may be separately stored in the memory. Optionally, the memory may include any memory associated with the display device, a graphics processing unit, a processor, a computer, etc. Additionally, in another embodiment, a driver, the display device, a manufacturer, a designer, a user, and/or any other entity may set the settings, values, etc. in each of the overdrive tables.

Furthermore, in yet another embodiment, the first table and the second table may be implemented as a single overdrive table. Additionally, as an option, the single overdrive table may be included, stored, etc. in the memory. For example, the first table and the second table may utilize a single shared overdrive table stored in the memory.

In addition, in one embodiment, the single overdrive table may be reprogrammed for the determined phase during between two frames. Optionally, reprogramming the single overdrive table may include loading, updating, storing, etc. settings in the single overdrive table associated with the determined phase.

As an example, the single overdrive table may be reprogrammed for the determined phase during a vertical blank period between two frames. Further, as an option, the single overdrive table may be updated by the display device, a processor of the display device, a process associated with the display device, a graphics processing unit, a driver, etc. For example, the driver associated with the graphics processing unit may update the single shared overdrive table during the vertical blank period between two frames. Additionally, as another example, the process associated with the display device may update the single shared overdrive table during the vertical blank period between two frames.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
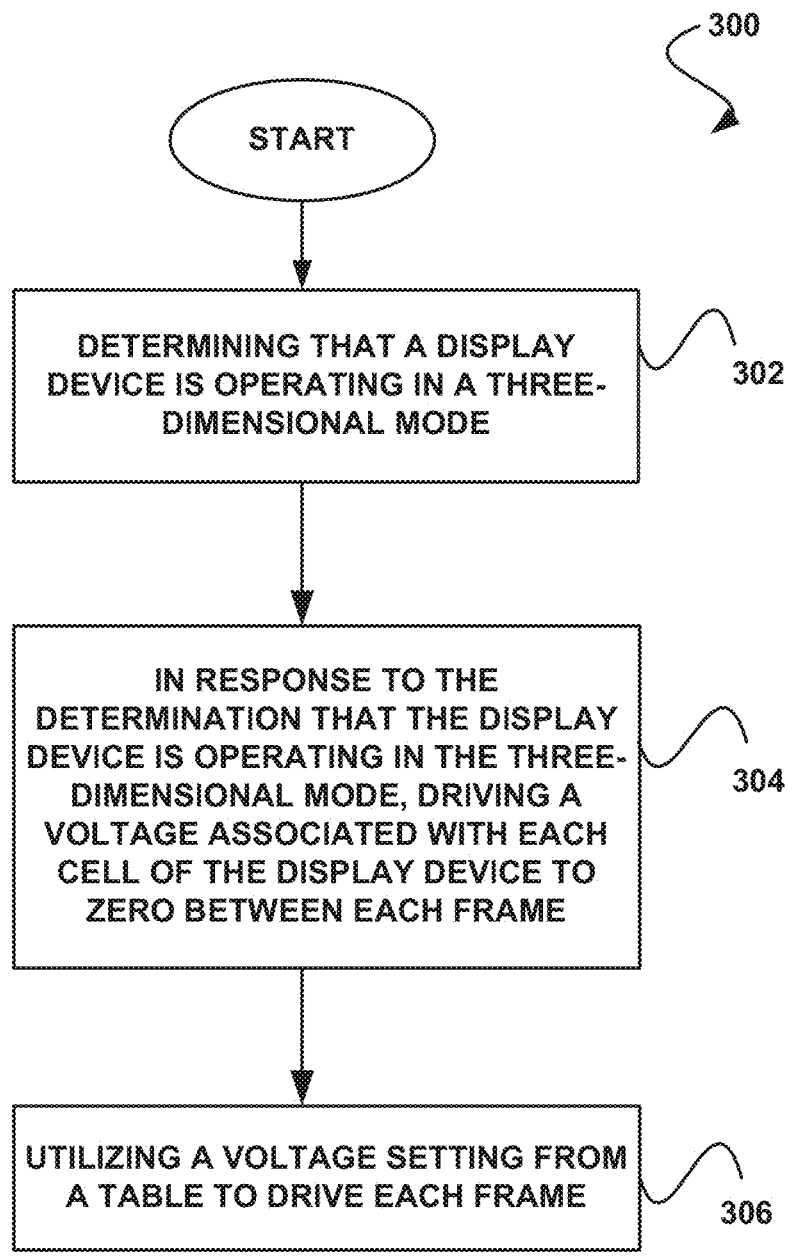
FIG. 3 shows a method for applying a setting for each frame, in accordance with another embodiment.

FIG. 3 shows a method 300 for applying a setting for each frame, in accordance with another embodiment. As an option, the present method 300 may be implemented in the context of the functionality and architecture of FIGS. 1-2. Of course, however, the method 300 may be carried out in any desired environment. It should also be noted that the aforementioned definitions may apply during the present description.

As shown in operation 302, it is determined that a display device is operating in a three-dimensional mode. Furthermore, in response to the determination that the display device is operating in the three-dimensional mode, a voltage associated with each cell of the display device is driven to zero between each frame. See operation 304. As an option, the voltage associated with each cell of the display device may be driven to zero during a vertical blank period between each frame. For example, driving each cell of the display device to zero voltage during the vertical blank period between a first frame and a second frame may remove a dependency on the first frame to achieve a final luminosity for the frame.

Additionally, as shown in operation 306, a voltage setting from a table is utilized to drive each frame. As an option, the setting may include a corrected voltage and the table may include an overdrive table. Optionally, after driving the voltage associated with each cell to zero, a voltage setting (e.g. a drive voltage) from the table (e.g. an overdrive table) may be utilized in driving a correct voltage to each cell of the display device for the frame. As an example, if the display device drives each cell's voltage value to zero volts between each frame, then a single overdrive table may be utilized for each frame and the overdrive table may not need to be updated between each frame.

Figure 4:
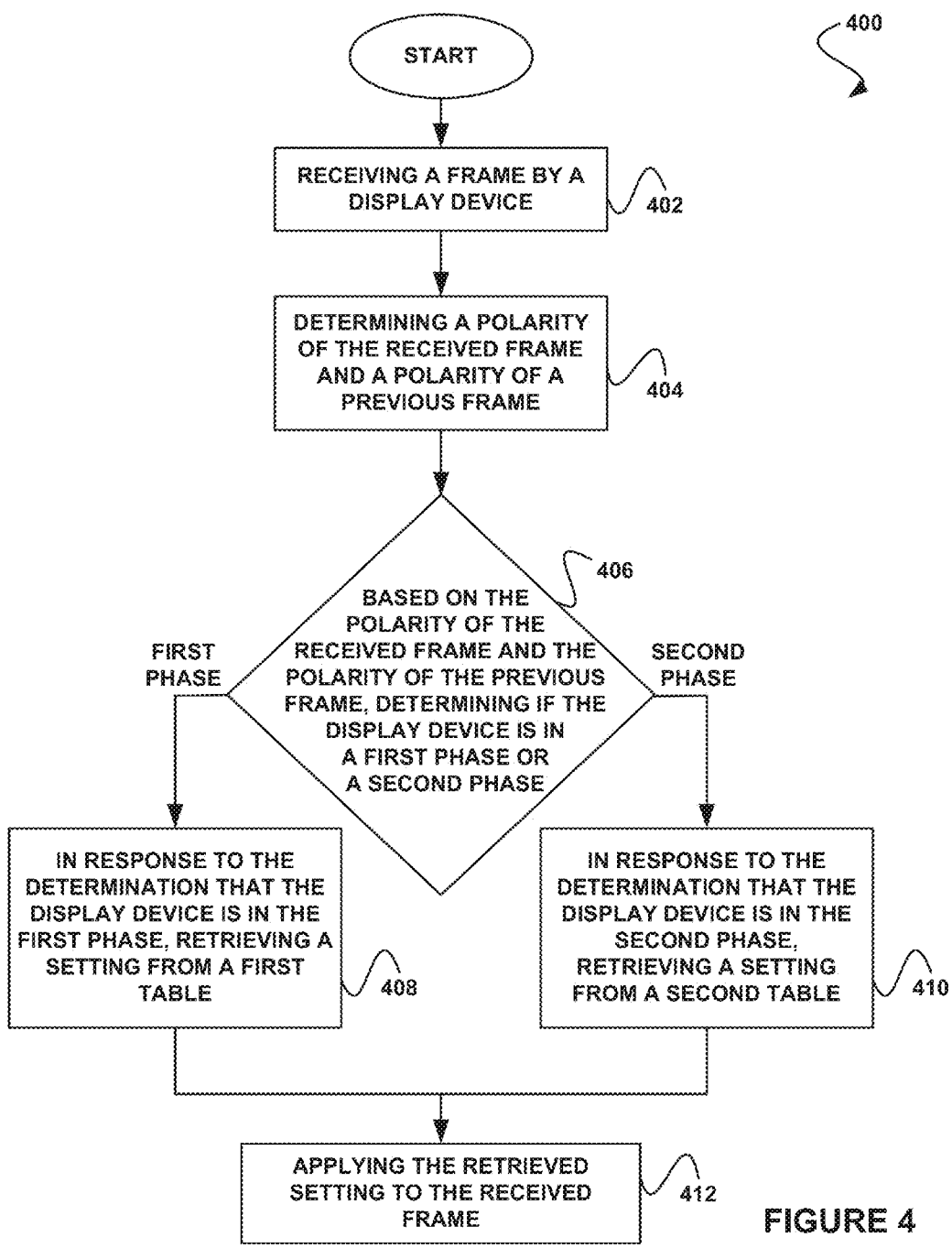
FIG. 4 shows a method for applying a setting based on a determined phase of a frame, in accordance with yet another embodiment.

FIG. 4 shows a method 400 for applying a setting based on a determined phase of a frame, in accordance with yet another embodiment. As an option, the present method 400 may be implemented in the context of the functionality and architecture of FIGS. 1-3. Of course, however, the method 300 may be carried out in any desired environment. It should also be noted that the aforementioned definitions may apply during the present description.

As shown in operation 402, a frame is received by the display device. As an option, the received frame may be received by the display device when the display device is operating in a three-dimensional mode. Optionally, the three-dimensional mode may include displaying a three-dimensional image utilizing a frame sequential method. Further, the frame sequential method may include displaying a frame for a left eye, in sequence with displaying a frame for a right eye. Additionally, in one embodiment, the display device may utilize a three-dimensional mode aware polarity reversal where the display device inverts a drive polarity of each cell of the display device every other frame.

For example, utilizing the frame sequential method, a region of cells of the display device may be black (e.g. gray value 0 (G0)) in a first frame intended for a left eye, and the same region of cells of the display device may be gray (e.g. gray value 160 (G160)) in a second frame intended for a right eye. In the context of the current example, for the region of cells, each cell may be driven as G0, G160, G0, G160, etc. switching a value each frame. Furthermore, utilizing the three-dimensional mode aware polarity reversal, which may invert the drive polarity every other frame, a voltage polarity sequence for a particular cell in the region of cells may include $+V_{G0}, +V_{G160}, -V_{G0}, -V_{G160}, +V_{G0}, +V_{G160}$, etc.

As yet another example, for a region of cells of the display device, a stereo driver (e.g. associated with a graphics processing unit) may be driving G0 for the region of cells of a first frame, G160 for the region of cells of a second frame, G0 for the region of cells of a third frame, and G160 for the region of cells of a fourth frame. Further, in the context of the current example, the display device may translate G0 to 27 volts (27V) and G0 to 10V. Additionally, in the context of the current example, with a frame inversion interval of every other frame, the display device may be driving voltage polarity for a particular set of cells in the region of cells as +V, +V, −V, and −V. Therefore, in the current example, the particular set of cells in the region of cells of the display device may receive +27V, +10V, −27V, and −10V, which may result in a direct current balance for the particular set of cells in the region of cells of the display device since a sum of the voltages for the particular set of cells in the region of cells for the frames is 0V. Further, as an option, a torque of an LCD molecule of the display device may be proportional to the voltage squared.

In addition, a polarity of the received frame and a polarity of a previous frame are determined. See operation 404. As an example, the previous frame may include the frame immediately preceding the received frame. Furthermore, based on the polarity of the received frame and the polarity of the previous frame, it is determined if the display device is in a first phase or a second phase. See decision 406.

In one embodiment, the display device may startup in either a first phase or a second phase. Optionally, the display device may randomly startup in either the first phase or the second phase. In another embodiment, the phase may be determined after the display device startup based on the polarity of the received frame and the polarity of a previous frame. Further, as an option, after the display device startup, a first frame may be initially ignored and the phase may be determined during a second frame (e.g. once the polarity of the received frame and the polarity of the previous frame are both available).

As an example, the first phase may include a drive voltage sequence of $+V_{G0}, -V_{G160}, -V_{G0}, +V_{G160}$, etc., and the second phase may include a drive voltage sequence of $+V_{G0}, +V_{G160}, -V_{G0}, -V_{G160}$, etc. Further, in the context of the current example, from a point of view of G160, the previous frame (e.g. G0) may be driven with an opposite drive polarity in the first phase, and the previous frame may be driven with a same drive polarity in the second phase.

In another embodiment, the first phase may be selected if a previous right eye frame includes a negative polarity (e.g. $-V_{G160}$) and a current right eye frame includes a positive polarity (e.g. $+V_{G160}$). As another example, the second phase may be selected if the previous right eye frame includes a positive polarity (e.g. $+V_{G160}$) and the current right eye frame includes a negative polarity (e.g. $-V_{G160}$). As an option, the first phase may include either a left eye view or a right eye view. Additionally, as another option, the second phase may include either a left eye view or a right eye view.

Also, as shown in operation 408, in response to the determination that the display device is in the first phase, a setting is retrieved from a first table. Optionally, the first table may include an overdrive table. Additionally, the first table may be selected in response to the determination that the display device is in the first phase. Further, as an option, the setting from the first table may include a value utilized to adjust a drive voltage of the received frame. For example, the setting for the drive voltage may be looked up in an overdrive table associated with the first phase.

Further, as shown in operation 410, in response to the determination that the display device is in the second phase, a setting is retrieved from a second table. Optionally, the second table may include an overdrive table. Additionally, the second table may be selected in response to the determination that the display device is in the second phase. Further, as an option, the setting from the second table may include a value utilized to adjust a drive voltage of the received frame. For example, the setting for the drive voltage may be looked up in an overdrive table associated with the second phase.

Additionally, the retrieved setting is applied to the received frame. See operation 412. As an option, the setting retrieved from the first table or the second table may be utilized to adjust the drive voltage of the received frame. Optionally, adjusting the drive voltage of the received frame utilizing the setting from the first table may increase or decrease a luminosity of cells of the display device in the first phase. Further, as another option, adjusting the drive voltage of the received frame utilizing the setting from the second table may increase or decrease a luminosity of the cells of the display device in the second phase. As an example, the setting from the first table may be utilized to adjust the drive voltage of the received frame so that a luminance of identical cells (e.g. G160 cells) in different frames are identical in the first phase and the second phase. Thus, in one embodiment, the retrieved setting from the first table or the second table may be applied at a correct time based on the determined phase.

Figure 5:
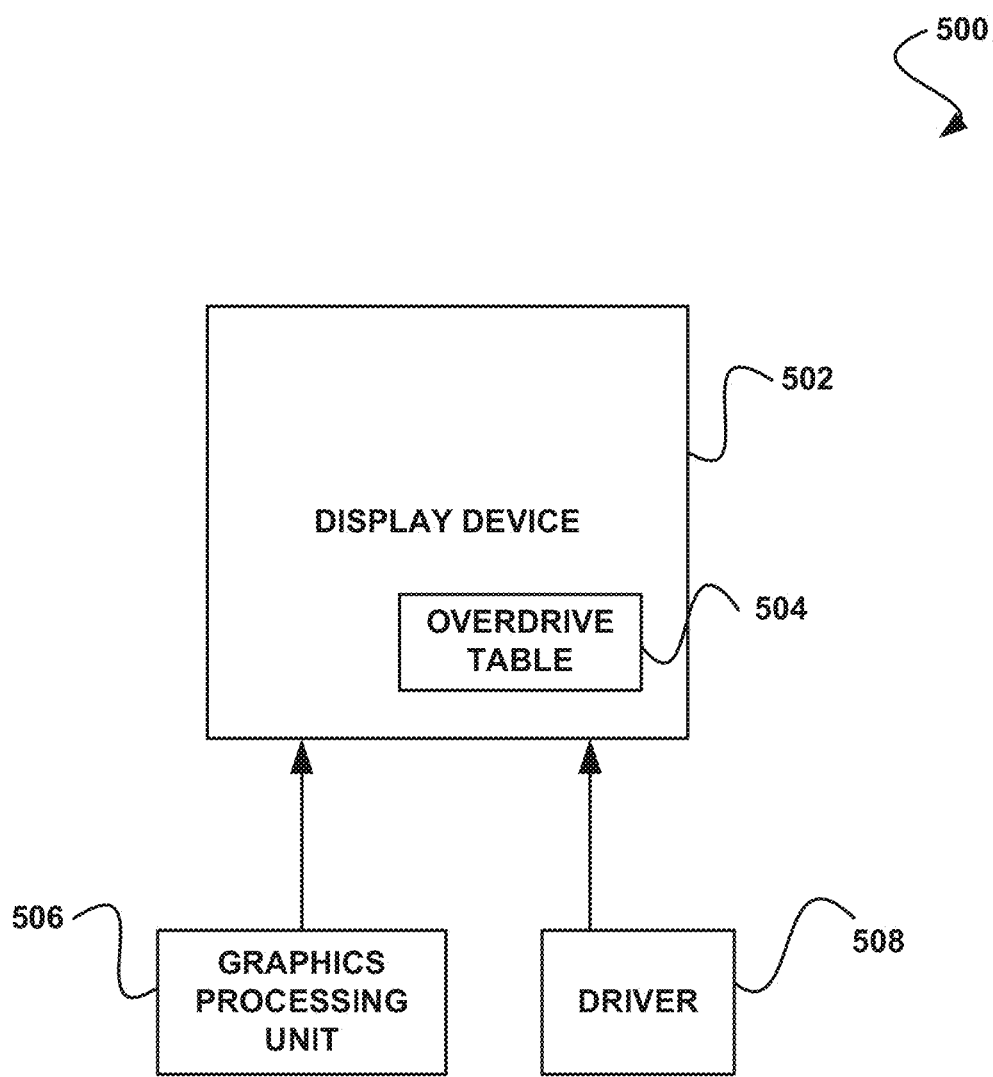
FIG. 5 shows a system for updating an overdrive table for a display device, in accordance with still yet another embodiment.

FIG. 5 shows a system 500 for updating an overdrive table for a display device, in accordance with still yet another embodiment. As an option, the present system 500 may be implemented in the context of the functionality and architecture of FIGS. 1-4. Of course, however, the system 500 may be implemented in any desired environment. It should also be noted that the aforementioned definitions may apply during the present description.

In one embodiment, the system 500 may include a display device 502. Additionally, the display device 502 may include an overdrive table 504. As an option, the overdrive table 504 may include a single shared overdrive table. For example, the single shared overdrive table may be utilized to store settings for a first phase and a second phase of the display device 502.

Additionally, in accordance with the embodiment, the system 500 may include a driver 508. As an option, the driver 508 may be in communication with the display device 502. Further, as another option, the driver 508 may be in communication with the overdrive table 504 of the display device 502. Furthermore, the driver 508 may be associated with a graphics processing unit 506 that is in communication with the display device 502 and/or the overdrive table 504.

In addition, as an option, the graphics processing unit 506 may update the overdrive table 504. As another option, the graphics processing unit 506 may update the overdrive table 504 if the display device 502 and the graphics processing unit 506 are both integrated into a single system.

Further, as yet another option, the driver 508 associated with the graphics processing unit 506 may update the overdrive table 504 if the display device 502 and the graphics processing unit 506 are both integrated into a single system. Optionally, the display device 502 may update the overdrive table 504 if the display device 502 and the graphics processing unit 506 are each integrated into separate systems. As an option, the driver 508, the display device 502, a processor of the display device 502, a manufacturer, a designer, a user, and/or any other entity may set the settings, values, etc. in the overdrive table 504.

Figure 6:
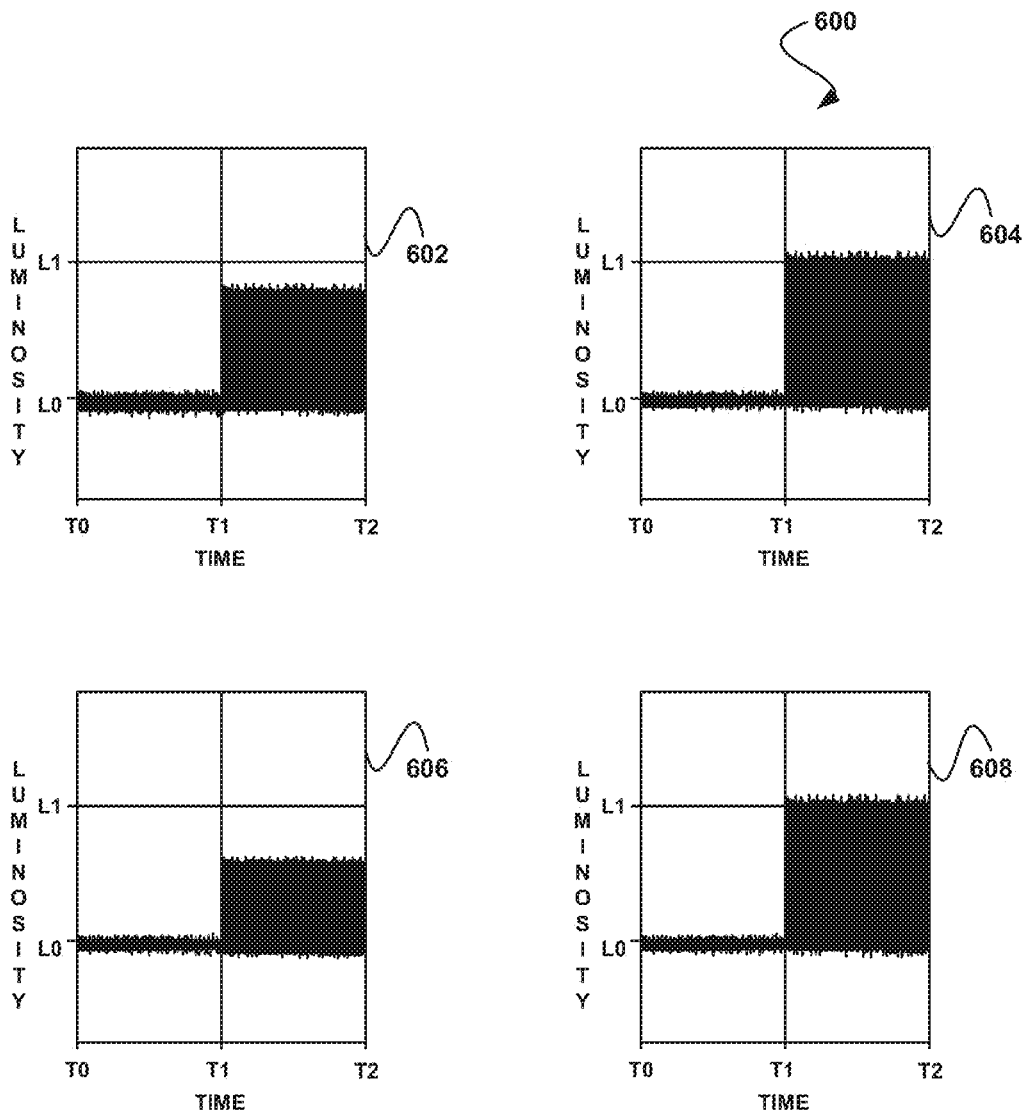
FIG. 6 shows an example of luminosity over time of a portion of a display device in a first phase and a second phase, in accordance with one embodiment.

FIG. 6 shows an example 600 of luminosity over time of a portion of a display device in a first phase and a second phase, in accordance with one embodiment. As an option, the present example 600 may result from an implementation in the context of the functionality and architecture of FIGS. 1-5. Of course, however, the example 600 may result from an implementation of any of the aforementioned embodiments. It should also be noted that the aforementioned definitions may apply during the present description.

In one embodiment, a luminance level of cells (e.g. G160 cells) for a plurality of frames driven with a first phase voltage polarity may be higher than a luminance level of cells (e.g. G160 cells) for a plurality of frames driven with a second phase voltage polarity. In the context of the current example, a luminosity of G160 cells for the plurality of frames in the first phase and a luminosity of G160 cells for the plurality of frames in the second phase may be adjusted utilizing an overdrive table. Further, adjusting the luminosity of the cells for the plurality of frames in the first phase or the second phase utilizing the overdrive table may result in the luminosity of the cells for the plurality of frames in the first phase and the luminosity of the cells for the plurality of frames in the second phase being identical, similar, etc.

In the context of the current example, starting at time T0 until time T1, a first plurality of frames is displayed. Additionally, a portion of the first plurality of frames is displaying a cell value of G0. Further, an average luminosity for the portion of the first plurality of frames that is displaying the cell value of G0 is indicated as L0.

Additionally, in the context of the current example, starting at time T1 until time T2, a second plurality of frames is displayed. In addition, a portion of the second plurality of frames is displaying a cell value that alternates between G0 and G160 every frame.

Additionally, in the context of the current example, a luminosity for the portion of the second plurality of frames that is displaying the cell value of G160 over time (e.g. from T1 to T2) in a first phase prior to an adjustment is illustrated in 602; and a luminosity for the portion of the second plurality of frames that is displaying the cell value of G160 over time (e.g. from T1 to T2) in the first phase after the adjustment is illustrated in 604.

Furthermore, in the context of the current example, a luminosity for the portion of the second plurality of frames that is displaying the cell value of G160 over time (e.g. from T1 to T2) in a second phase prior to an adjustment is illustrated in 606; and a luminosity for the portion of the second plurality of frames that is displaying the cell value of G160 over time (e.g. from T1 to T2) in the second phase after the adjustment is illustrated in 608.

Thus, as illustrated in example 600, when the display device is operating in the three-dimensional mode, inverting the polarity of each of the cells of the display device every other frame may allow for the cells of the display device to be direct current balanced. Furthermore, utilizing a specific overdrive table for a phase associated with a particular frame may allow each cell to have a consistent luminosity for an entire duration of the frame.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    determining that a display device is operating in a three-dimensional mode, wherein the display device includes a first overdrive table associated with a first phase and a second overdrive table associated with a second phase;
    determining a phase of a current frame by comparing a polarity of the current frame to a polarity of a previous frame; and
    if the phase of the current frame is the first phase, then driving one or more cells of the display device based on a first setting in the first overdrive table, or
    if the phase of the current frame is the second phase, then driving the one or more cells of the display device based on a second setting in the second overdrive table.

2. The method of claim 1, wherein the polarity of the current frame is the opposite of the polarity of the previous frame in the first phase, and wherein the polarity of the current frame is the same as the polarity of the previous frame in the second phase.

3. The method of claim 1, wherein the first overdrive table comprises a first portion of a single, shared overdrive table and the second overdrive table comprises a second portion of the single, shared overdrive table.

4. The method of claim 1, wherein the first overdrive table includes at least one voltage setting for driving one or more cells of the display device when the phase of the current frame is the first phase, and the second overdrive table includes at least one additional voltage setting for driving the one or more cells of the display device when the phase of the current frame is the second phase.

5. The method of claim 1, wherein the display device comprises a liquid crystal display (LCD) panel having a plurality of cells, each cell of the LCD panel capable of being driven by a voltage having a first polarity as well as a voltage having a second polarity that is the inverted polarity of the first polarity.

6. The method of claim 5, wherein the display device is configured to invert the polarity of the voltage used to drive the cells of the liquid crystal display every other frame when the display device is operating in the three-dimensional mode.

7. The method of claim 1, wherein the display device is associated with a pair of active shutter glasses.

8. The method of claim 1, wherein the display device includes an active polarization device utilized to view three-dimensional content using passive polarization glasses.

9. The method of claim 1, wherein the display device is capable of operating in one of a two-dimensional mode and the three-dimensional mode.

10. The method of claim 1, wherein the display device includes a single overdrive table that is reprogrammed during a vertical blanking period between the current frame and the previous frame, the single overdrive table programmed as the first overdrive table if the phase of the current frame is the first phase, or the single overdrive table programmed as the second overdrive table if the phase of the current frame is the second phase.

11. The method of claim 10, wherein a driver associated with a graphics processing unit updates the single overdrive table.

12. The method of claim 10, wherein a process associated with the display device updates the single overdrive table.

13. A computer program product embodied on a non-transitory computer readable medium, the computer program product comprising a number of instructions that, when executed by a processor, cause the processor to perform the steps of:
    determining that a display device is operating in a three-dimensional mode, wherein the display device includes a first overdrive table associated with a first phase and a second overdrive table associated with a second phase;
    determining a phase of a current frame by comparing a polarity of the current frame to a polarity of a previous frame; and
    if the phase of the current frame is the first phase, then driving one or more cells of the display device based on a first setting in the first overdrive table, or
    if the phase of the current frame is the second phase, then driving the one or more cells of the display device based on a second setting in the second overdrive table.

14. The computer program product embodied on the non-transitory computer readable medium of claim 13, wherein the polarity of the current frame is the opposite of the polarity of the previous frame in the first phase, and wherein the polarity of the current frame is the same as the polarity of the previous frame in the second phase.

15. The computer program product embodied on the non-transitory computer readable medium of claim 13, wherein the first overdrive table includes at least one voltage setting for driving one or more cells of the display device when the phase of the current frame is the first phase, and the second overdrive table includes at least one additional voltage setting for driving the one or more cells of the display device when the phase of the current frame is the second phase.

16. A system, comprising:
    a display device configured to:
        determine that a display device is operating in a three-dimensional mode, wherein the display device includes a first overdrive table associated with a first phase and a second overdrive table associated with a second phase;

determine a phase of a current frame by comparing a polarity of the current frame to a polarity of a previous frame; and if the phase of the current frame is the first phase, then driving one or more cells of the display device based on a first setting in the first overdrive table, or if the phase of the current frame is the second phase, then driving the one or more cells of the display device based on a second setting in the second overdrive table.

17. The system of claim 16, wherein the polarity of the current frame is the opposite of the polarity of the previous frame in the first phase, and wherein the polarity of the current frame is the same as the polarity of the previous frame in the second phase.

18. The system of claim 16, wherein the first overdrive table includes at least one voltage setting for driving one or more cells of the display device when the phase of the current frame is the first phase, and the second overdrive table includes at least one additional voltage setting for driving the one or more cells of the display device when the phase of the current frame is the second phase.

19. The system of claim 16, wherein the display device comprises a liquid crystal display (LCD) panel having a plurality of cells, each cell of the LCD panel capable of being driven by a voltage having a first polarity as well as a voltage having a second polarity that is the inverted polarity of the first polarity.

20. The system of claim 16, further comprising:

a graphics processing unit coupled to the display device and configured to transmit image data for the current frame and the previous frame to the display device; and a driver associated with the graphics processing unit, the driver configured to update the settings in the first overdrive table and/or the second overdrive table.

* * * * *